United States Patent
Howard

(10) Patent No.: US 7,735,321 B2
(45) Date of Patent: Jun. 15, 2010

(54) OTEC COLD WATER PIPE SYSTEM

(75) Inventor: Robert J. Howard, Clifton, VA (US)

(73) Assignee: Lockheed Martin Corporation, Bethesda, MD (US)

(*) Notice: Subject to any disclaimer, the term of this patent is extended or adjusted under 35 U.S.C. 154(b) by 130 days.

(21) Appl. No.: 12/014,625

(22) Filed: Jan. 15, 2008

(65) Prior Publication Data

US 2009/0178722 A1 Jul. 16, 2009

(51) Int. Cl.
*F01K 27/00* (2006.01)
*B63B 35/44* (2006.01)
*F16L 3/00* (2006.01)

(52) U.S. Cl. .................... 60/641.7; 60/641.1; 114/264; 138/106

(58) Field of Classification Search ............. 60/641.6, 60/641.7; 114/230.12, 264–267; 441/1, 441/136; 138/106, 107
See application file for complete search history.

(56) References Cited

U.S. PATENT DOCUMENTS

| | | | |
|---|---|---|---|
| 3,605,668 A | 9/1971 | Morgan | |
| 4,014,279 A * | 3/1977 | Pearson | 114/382 |
| 4,087,975 A | 5/1978 | Owens | |
| 4,116,009 A * | 9/1978 | Daubin | 114/264 |
| 4,231,312 A | 11/1980 | Person | |
| 4,273,068 A | 6/1981 | McNary | |
| 4,281,614 A | 8/1981 | McNary et al. | |
| 4,312,288 A | 1/1982 | Finsterwalder et al. | |
| 4,350,014 A * | 9/1982 | Sanchez et al. | 60/641.7 |
| 4,363,570 A | 12/1982 | Van der Pot | |
| 4,373,338 A | 2/1983 | Van der Pot | |
| 4,497,342 A | 2/1985 | Wenzel et al. | |
| 4,662,785 A | 5/1987 | Gibb et al. | |
| 4,703,626 A | 11/1987 | Jensen | |
| 5,447,392 A | 9/1995 | Marshall | |
| 5,513,494 A | 5/1996 | Flynn et al. | |
| 5,555,838 A * | 9/1996 | Bergman | 114/265 |
| 5,582,691 A | 12/1996 | Flynn et al. | |
| 5,794,863 A * | 8/1998 | Kochnev et al. | 241/40 |
| 5,951,061 A | 9/1999 | Arlt, III et al. | |
| 6,942,427 B1 * | 9/2005 | Srinivasan | 405/210 |

FOREIGN PATENT DOCUMENTS

JP 57079270 5/1982

* cited by examiner

*Primary Examiner*—Thomas E Denion
*Assistant Examiner*—Christopher Jetton
(74) *Attorney, Agent, or Firm*—Schwegman, Lundberg & Woessner, P.A.

(57) ABSTRACT

A system for relieving the stress on an Ocean Thermal Energy Conversion (OTEC) cold water pipe includes a slidable joint that couples the OTEC cold water pipe to a surge tank at an opening in the surge tank. The system can further include a first flotation device that is coupled to the OTEC cold water pipe below the surge tank, and a second flotation device that is coupled to the OTEC cold water pipe within the surge tank.

14 Claims, 3 Drawing Sheets

OTEC COLD WATER PIPE SYSTEM

TECHNICAL FIELD

Various embodiments relate to Ocean Thermal Energy Conversion (OTEC) systems, and in an embodiment, but not by way of limitation, to relieving stress on cold water pipes in OTEC systems.

BACKGROUND

The cold water pipe for an Ocean Thermal Energy Conversion (OTEC) plant is massive and is subject to huge stresses at the joint between the cold water pipe and the OTEC platform. These stresses result from a combination of severe weather, wave action, and the length, diameter, and mass of the cold water pipe. For example, in a 100 MW OTEC plant, the cold water pipe would typically contain 100 million kilograms of water, and the actual mass of the cold water pipe itself would be on the order of 10 million to 50 million kilograms.

DETAILED DESCRIPTION

Figure 1:
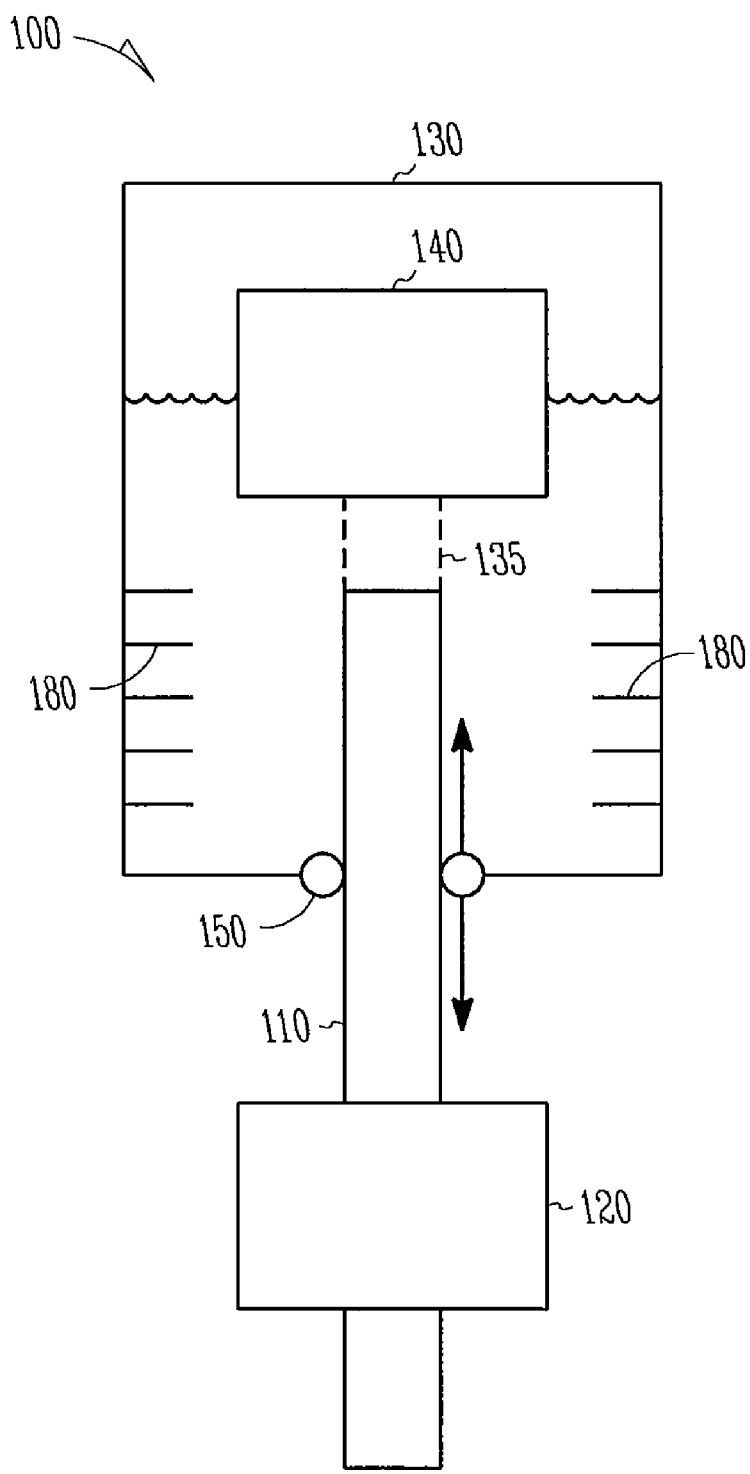
FIG. 1 illustrates a side view of an example embodiment of an OTEC cold water pipe system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

One or more figures show block diagrams of systems and apparatus of embodiments of the invention. One or more figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In an Ocean Thermal Energy Conversion (OTEC) system, wave action can cause a full six degrees of freedom of motion at the joint between the OTEC plant/platform and the cold water pipe. This can cause catastrophic failure of the cold water pipe at the OTEC platform because of the hard mounting of the cold water pipe to the platform. It has been estimated that a hard mounted cold water pipe will experience forces on the order of 3E9 Newtons in 40 meter peak to peak waves.

To address one or more problems associated with the stresses experienced by a hard mounted cold water pipe, in an embodiment, an OTEC cold water pipe discharges into a surge volume tank. One advantage to this design is the avoidance of water hammer, a condition that can occur in pipes where a slug of liquid inside the pipe is propelled at a high velocity or is subjected to a quick high pressure spike. The rapidly moving slug of liquid or pressure spike "hammers" liquid (a non-compressible) against the inside of the pipe. In an embodiment, the surge volume is implemented as a "moon well" at the center of the OTEC platform. The OTEC pipe can include two floatation systems. The first can be placed at some depth below the platform and can support most of the weight of the cold water pipe. The second floatation system can be placed above the pipe in the moon well, can support the remainder of the weight of the pipe, and also can contribute some amount of reserve buoyancy. In an embodiment, the depth of the moon well is 40 meters or greater.

To further address the one or more problems associated with a hard mounted cold water pipe, a vertical sliding/rolling joint is positioned between the pipe and the OTEC platform. Large rollers may avoid the galling that a sliding joint could experience. When rollers are used, the number and size of the rollers should be sufficient to bear the sideway forces, and the segment of the pipe that forms part of the joint should have a high enough crush strength to withstand the pressure of the rollers. As an example, if conventional rubber tires are used as rollers, and further if the tires are inflated to 10 atmospheres pressure, then approximately 50 square meters of roller contact area could be required to absorb the stress. Steel rollers would allow the pressure to be raised to 1E9 Newtons per square meter. This would reduce the required contact area to something on the order of one meter squared.

Another feature of the system in an embodiment is a compliant mounting for the sliding joint. This permits free rotation of the sliding joint. Because a ball joint on the scale required for an OTEC platform is not currently practical, a joint consisting of multiple, large diameter ropes can be used. The ropes should have a combined strength that is sufficient to withstand the lateral forces. The use of compliant ropes also has an advantage of softening some of the lateral shocks and forces. Vanes can be mounted between the layers of rope to control cold water loss through the bottom of the moon well.

The surge tank, sliding/rolling joint, and compliant mounting provide stress relief to an OTEC cold water pipe. The system further provides mitigation for four of the six degrees of freedom, and shock relief for the remaining two degrees of freedom.

FIG. 1 illustrates an example embodiment of an Ocean Thermal Energy Conversion (OTEC) system 100. The system 100 includes a cold water pipe 110, a first floatation device 120, a surge tank 130, a second floatation device 140, a means 135 (such as ropes) to connect the second flotation device 140 to the cold water pipe 110, multi-layered and overlapping vanes 180, and a sliding or rolling joint system 150. In an embodiment, the opening in the surge tank 130 through which the OTEC cold water pipe 110 is inserted is approximately 1-2 times the diameter of the cold water pipe 110. Such an opening may be defined by vertical walls to which a compliant rope system can be anchored as disclosed below.

As illustrated in FIG. 1, the OTEC cold water pipe 110 discharges into the surge tank 130. This setup avoids water hammer. The surge volume will most likely be implemented as a "moon well" at the center of an OTEC platform. As illustrated in FIG. 1, the OTEC cold water pipe 110 includes two flotation systems—a first floatation system 120 and a second floatation system 140. The first floatation system 120 is attached to the cold water pipe 110 at some depth (e.g., 100 meters) below the OTEC platform, and it will take up most of the weight of the cold water pipe 110. The second floatation system 140 sits above the pipe in the moon well and takes up the remainder of the pipe's weight with some amount of reserve buoyancy. It is noted that the depth of the moon well should be greater than approximately 40 meters.

Figure 3:
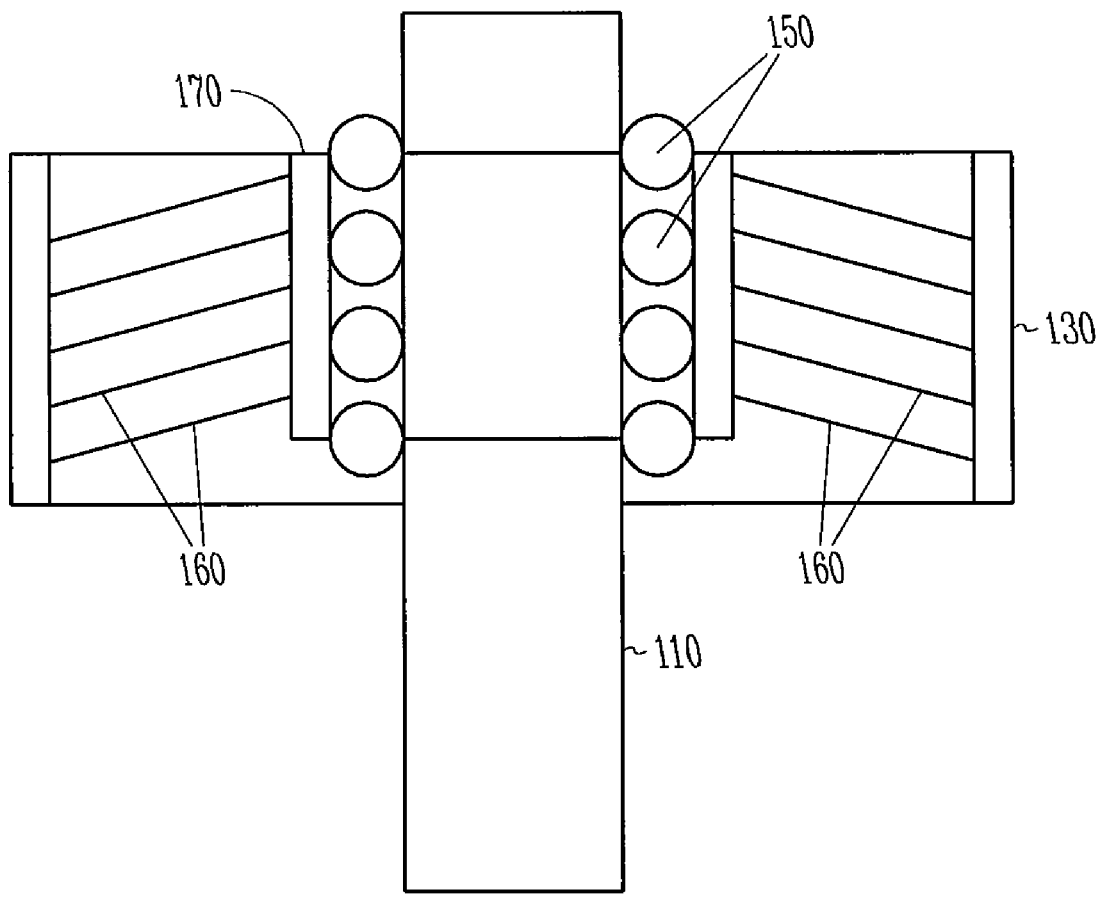
FIG. 3 illustrates a side view of an example embodiment of a roller system for an OTEC cold water pipe system.

FIG. 3 illustrates in further detail the joint between the OTEC cold water pipe 110 and the surge tank 130. Positioned around the OTEC cold water pipe 110 is a support ring 170 containing rollers 150. Attached to the support ring 170 are a plurality of compliant ropes 160. The compliant ropes 160 should be made out of a material that has some degree of elasticity such as nylon or polyester. The other end of the compliant ropes 160 is attached to the surge tank 130. The attachment to the surge tank 130 can be to the inner wall of the tank 130, or to a cylindrical walled opening that forms the opening in the surge tank.

Figure 2:
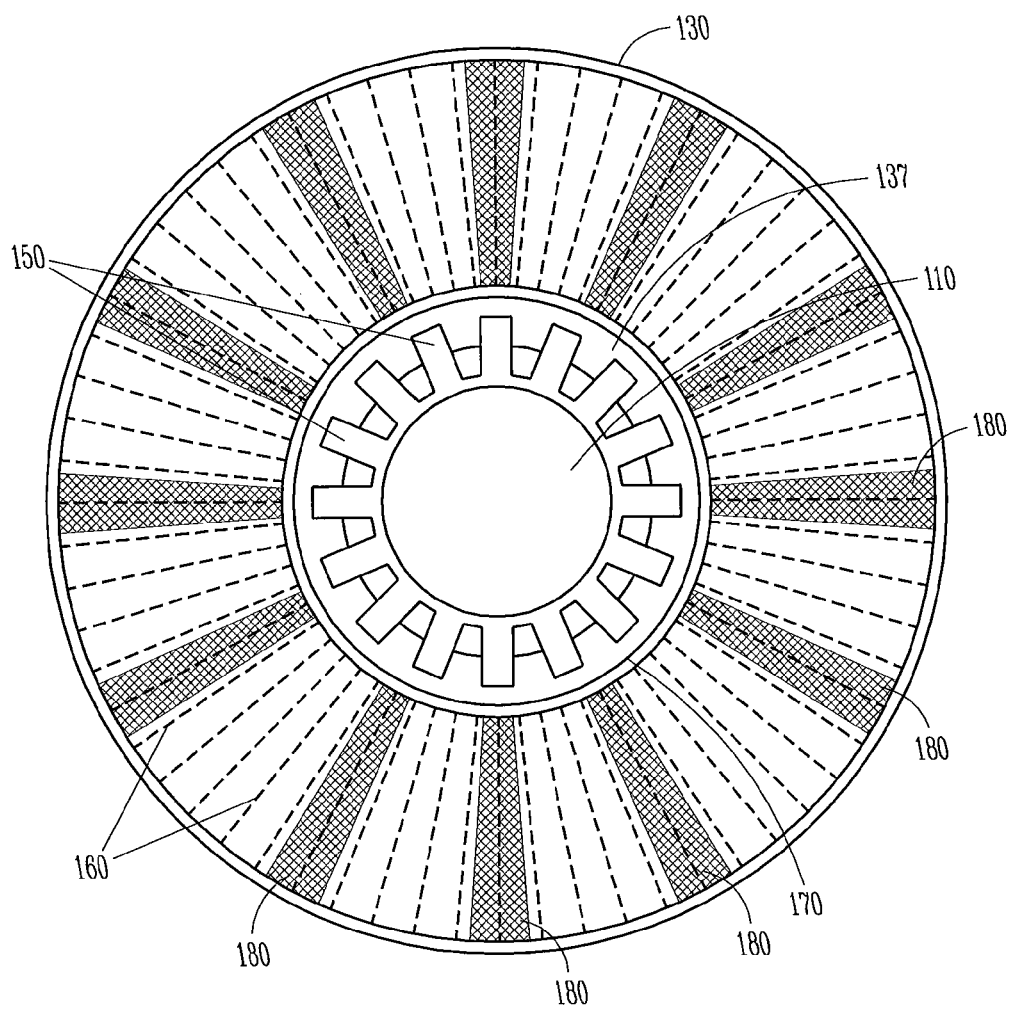
FIG. 2 illustrates a top planar view of an example embodiment of an OTEC cold water pipe system.

FIG. 2 illustrates a top view of the OTEC cold water pipe system. FIG. 2 illustrates the cold water pipe 110, the support ring 170 and rollers 150, the compliant ropes 160, the plurality of vanes 180, and the moon pool hull 137 of the surge tank 130. As illustrated in FIG. 1, there are several levels of vanes 180. In FIG. 2, only one level of vanes is shown so as to illustrate the manner in which the vanes 180 circumscribe the tank 130. The vanes 180 are arranged such that each layer is offset somewhat from the layer above and below it, and is somewhat overlapping. The overlapping arrangement of the vanes 180 prevent the water from running out of the surge tank 130.

In an embodiment, the water from the surge tank 130 is drawn out, for example via suction, and transported to the cold side of an OTEC heat exchanger.

Thus, an example system and method for relieving stress on an OTEC cold water pipe has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The invention claimed is:

1. A system comprising: a surge tank having an opening, the surge tank configured to receive an Ocean Thermal Energy Conversion (OTEC) cold water pipe via the opening in the surge tank; a first flotation device configured to be coupled to the OTEC cold water pipe below the surge tank; a second flotation device configured to be coupled to the OTEC cold water pipe within the surge tank; a slidable joint configured to be coupled to the OTEC cold water pipe; and means for coupling the slidable joint to the surge tank.

2. The system of claim 1, wherein the slidable joint comprises one or more rollers.

3. The system of claim 2, wherein the rollers are housed within a support.

4. The system of claim 1, wherein the surge tank comprises a moon pool.

5. The system of claim 1, further comprising the OTEC cold water pipe, and wherein the first floatation device is coupled to the OTEC cold water pipe, the second floatation device is coupled to the OTEC cold water pipe, and the slidable joint couples the OTEC cold water pipe to the surge tank.

6. The system of claim 1, comprising a plurality of vanes, coupled to the surge tank, and arranged in a multi-level and overlapping manner in the surge tank.

7. A system comprising: a surge tank; an Ocean Thermal Energy Conversion (OTEC) cold water pipe coupled to the surge tank through an opening in the surge tank; a first flotation device coupled to the OTEC cold water pipe below the surge tank; a second flotation device coupled to the OTEC cold water pipe within the surge tank; and a slidable joint configured to be coupled to the OTEC cold water pipe; and means for coupling the slidable joint to the surge tank.

8. The system of claim 7, wherein the slidable joint comprises one or more rollers.

9. The system of claim 8, wherein the rollers are held in a support ring.

10. The system of claim 7, wherein the surge tank comprises a moon pool.

11. The system of claim 7, comprising a plurality of vanes, coupled to the surge tank, and arranged in a multi-level and overlapping manner in the surge tank.

12. A system comprising: a slidable joint with means for coupling an Ocean Thermal Energy Conversion (OTEC) cold water pipe to an OTEC platform; a surge tank with an opening, wherein the surge tank receives the OTEC cold water pipe through the opening; and a first floatation device and a second floatation device, the first floatation coupled to the OTEC cold water pipe below the surge tank, and the second floatation device coupled to the OTEC cold water pipe within the surge tank.

13. The system of claim 12, wherein the slidable joint comprises one or more rollers within a support housing.

14. The system of claim 12, further comprising the OTEC cold water pipe; and comprising a plurality of vanes, coupled to the surge tank, and arranged in a multi-level and overlapping manner in the surge tank.

* * * * *